T. MIDGLEY.
VULCANIZING EQUIPMENT.
APPLICATION FILED AUG. 11, 1919. RENEWED SEPT. 24, 1921.

1,417,551.

Patented May 30, 1922.
2 SHEETS—SHEET 1.

INVENTOR
Thomas Midgley.
BY Chapin + Neal
ATTORNEYS.

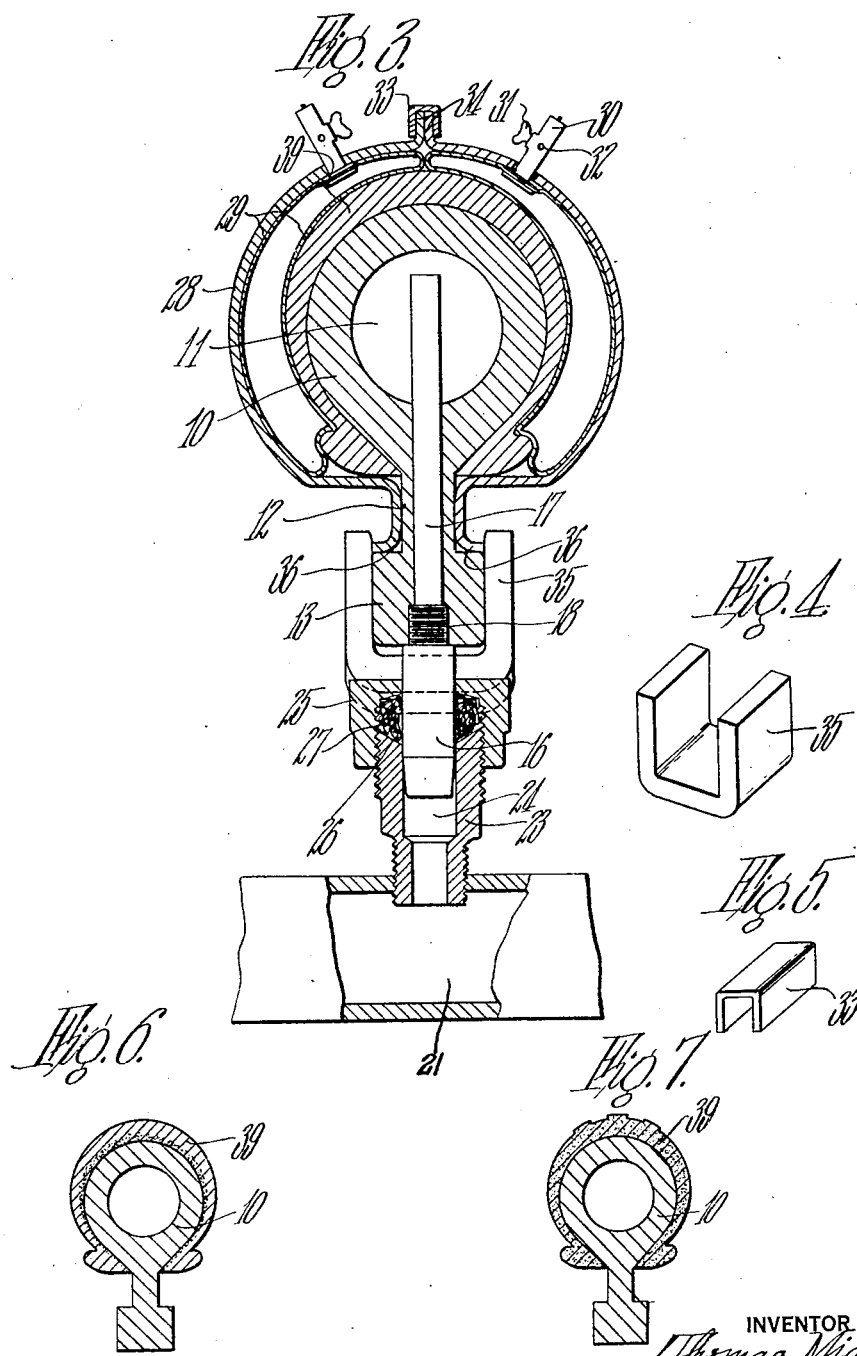

UNITED STATES PATENT OFFICE.

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS.

VULCANIZING EQUIPMENT.

1,417,551.  Specification of Letters Patent.  Patented May 30, 1922.

Application filed August 11, 1919, Serial No. 316,665. Renewed September 24, 1921. Serial No. 503,084.

*To all whom it may concern:*

Be it known that I, THOMAS MIDGLEY, a citizen of the United States of America, residing at Hampden, in the county of Hampden and State of Massachusetts, have invented certain new and useful Improvements in Vulcanizing Equipments, of which the following is a specification.

It has for its object the provision of a vulcanizing equipment which will enable the completely assembled tire casing to be given a partial or regional vulcanization extending from the inside outwardly substantially through the fabric layers but not through the tread; and to yieldably support the tread during this process to prevent the formation of large pockets or blisters due to the expansion of entrapped air or the generation of gas or steam in the body of the tire. A flexible mold made according to my invention may also be filled with a cooling medium for the purpose of maintaining the outside of the casing at a comparatively low temperature, thereby aiding in confining the vulcanization of the rubber substantially to the fabric layers. The use of the cooling fluid also has the advantage of exposing the outer surface of the casing to its action in the same manner as if it were in direct contact. The thin wall of the flexible mold acts much the same as a layer of the cooling fluid itself would in this function.

My invention will now be described in connection with the accompanying drawings, in which—

Fig. 3 is a sectional view showing the construction of the core and mold and the manner of securing them together. This figure also shows in detail the connection between the core, its discharge nipple and the discharge conduit for the cores.

Figs. 4 and 5 are perspective views of clips which may be used in securing the core and mold together;

Fig. 6 is a sectional view of a tire casing mounted on a core, showing diagrammatically the condition of the casing after the first step in the vulcanization; and Fig. 7 is a similar view showing the completely vulcanized casing.

Figure 1:
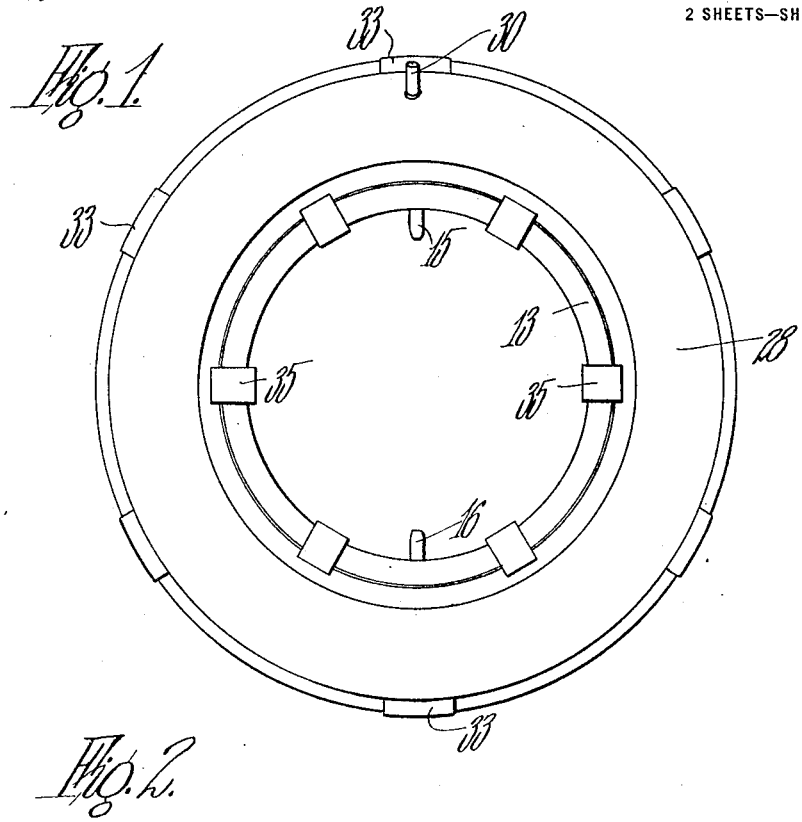
Fig. 1 is a side elevation of a core with my flexible mold mounted thereon.

The core 10 is in general of the usual shape, being, however, made hollow as at 11 to permit of the circulation of steam through it. The core has a restricted portion 12 and an inner circumferential ring 13. If clincher tires are to be made the core may be made in one piece, but in the manufacture of straight side tires it is made in sections, to permit of its being removed from the casing. To permit of the circulation of steam through the hollow core the latter is provided with nipples 15 and 16, shown in Fig. 1, one of which is illustrated in detail in Fig. 3. The nipple consists of a long tube 17, threaded into the core at 18 and extending well into the cavity 11 within the core.

Figure 2:
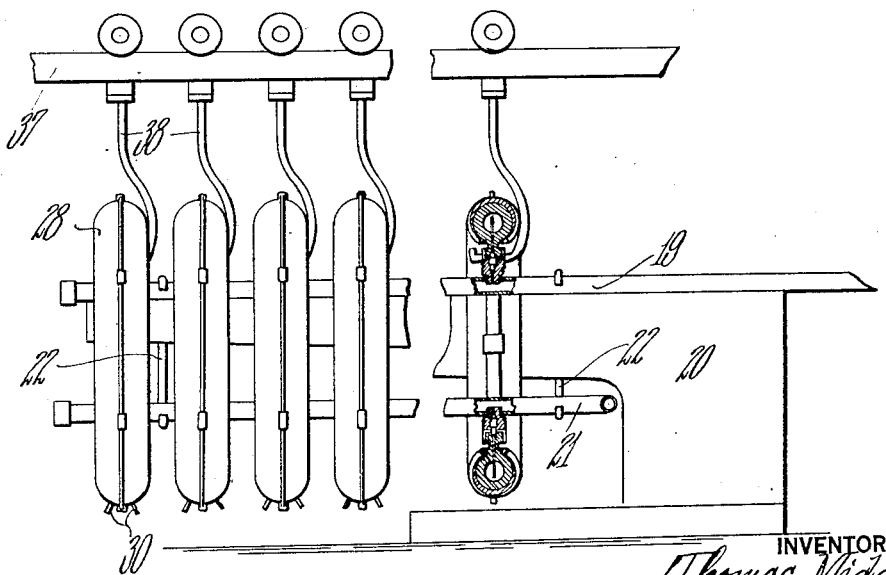
Fig. 2 is a diagrammatic view showing a plurality of cores and molds mounted on a track for convenience in vulcanizing the tire casings. One of the core and mold units is shown broken away to illustrate the connections of the core nipples to sources of supply and discharge.

The preferred form of device to secure the nipples to sources of supply and discharge is illustrated in Figs. 2 and 3. This preferred device which I have found suitable for the purpose will now be described. Steam is supplied to the cores by a pipe 19 preferably carried on a heavy bracket 20. An exhaust pipe 21 serves to convey the steam away from the cores and also any water of condensation as shown by the location of the outlet nipple 16 at the bottom of the core in Figs. 1 and 2. This pipe is preferably supported by hooks 22 from the inlet pipe, so that it may be raised to permit of its separation from the various cores. Screwed at intervals along both the inlet and exhaust pipes are plugs 23 having a hole 24 for the passage of steam or water of condensation and the reception of nipples 15 or 16. Threaded onto each plug is a nut 25, between which and the inwardly tapered end 26 of the plug is a packing 27. By turning the nut down upon the plug the packing is compressed upon the nipple to make a steam-tight joint.

The mold itself is composed of two sections 28, conveniently made of sheet metal, and an air or water bag 29 in each section. If the bag is used for air, as is preferable, it may be inflated through a valve 30 of the type customarily used for automobile tires, but having a three-way pet cock 31 which may be turned to permit the contained air to exhaust through an aperture 32. If desired, the pet cock may be dispensed with and the air exhausted by connecting the valve to a hose leading from a source of reduced pressure and having a tip adapted to release the valve 30, as is well understood in connection with various forms of air bags and tubes used in tire manufacture; or, if only a slight pressure is desired, inflating means may be entirely eliminated and reliance placed solely upon the expansion of the air contained in the bag by the vulcanizing heat. If the bags are designed for the reception or circulation of water or other fluid suitable connections may be made. In order to hold the outer peripheries of the two mold sections together clips 33, substantially U-shaped, as shown in perspective Fig. 5, are slipped over outstanding flanges 34 of the mold sections. Similar clips 35 may be slipped over the inner ring 13 of the core and the inner circumferential flanges 36 of the molds to hold the inner part of the mold against the core.

In the preferred method of operation a plurality of assembled cores and molds, which may be supported from conveying track 37 by the usual hooks 38, are connected to the steam and exhaust pipes as described above, the air bags inflated to the desired degree, and steam admitted to the hollow cores. Heating of the cores is continued until the tire casing 39 is vulcanized from the inside outwardly to the desired degree, usually so that the rubber associated with the fabric layers will be substantially vulcanized, while the tread rubber is practically unaffected by the heat so far as vulcanization is concerned. The condition of vulcanization at this point is indicated by the stippling in Fig. 6. During this heating the air bags will restrain any air, gas, or steam bubbles which may form within the tire structure from undue expansion, and will keep the outside of the casing generally in form. When the cores 10 are thoroughly heated by the steam circulating through them there will be little condensation of the steam. When however the cores are cold for example when the operation first starts there will be considerable water of condensation. For this reason I have constructed the nipples as shown in Fig. 3 so as to extend well into the casing. These nipples are located 180° apart one immediately over the other as shown in Figs. 1 and 2 to make the described connections with the pipes 19 and 21, the latter hung vertically below the former. With this construction the steam circulation and pressure must force the water of condensation from the lower part of each core out through nipples 16 to discharge pipe 21. This action keeps the interior portions 11 of cores 10 free for steam circulation. The special provision for this purpose is particularly useful as the outside of the casings on the cores are unheated and even cooled tending to increase the condensation of steam within the cores. After this partial step of vulcanization the flexible mold is removed; the casing cooled, if desired, and the tire completed by vulcanization while surrounded by wrappings or molds. The completed casing will be vulcanized throughout, as indicated by the stippling in Fig. 7.

By circulating water or other fluid through the bags 29 the outside of the casing can be kept cool, if desired, thereby preventing the spread of the vulcanization unduly through the casing. If it is not desired to use the method of vulcanization set forth above, the flexible mold will find use in giving to the fabric and rubber carcasses of tire casings the partial vulcanization of the so-called two cure method of vulcanization, or the carcass or entire casing may be completely vulcanized while under the influence of the mold.

I have described a vulcanizing equipment of new and useful construction particularly in the art of preheating or partial vulcanization of tire casings in a controlled and step by step manner. The possible operations of the equipment may be conveniently varied so that the desired pressure and heat conditions can be applied to a tire casing with great flexibility.

I claim—

1. A flexible mold comprising two separable sections each carrying an inflatable member.

2. A flexible mold comprising two circumferentially separable sections each carrying a flexible inflatable member.

3. A vulcanizing unit comprising a core, means for heating the core, and a mold surrounding the core and constructed and arranged to exert a yielding pressure upon a tire casing mounted on the core.

4. A vulcanizing unit comprising a core, means whereby the core may be heated, and a mold secured on the core and composed of two circumferentially separable sections, each section carrying a flexible member constructed and arranged to exert a yielding pressure upon a tire casing mounted on the core.

5. A vulcanizing unit comprising a hollow core, an inlet and an outlet constructed and arranged to permit of the circulation of a heating medium through the core, and a mold secured to the core and comprising separable sections each carrying a yielding member adapted to exert an elastic pressure upon a tire casing mounted upon the core.

6. A flexible mold comprising two opposed circumferentially separable shells having means by which they may be secured together and retained in place about a tire casing, each shell carrying an annular inflatable bag, and means whereby the bags may be inflated.

7. A vulcanizing unit comprising a core, means whereby the core may be heated, and a mold secured to the core and composed of two circumferentially separable sections, each section carrying an annular pneumatic bag constructed and arranged to exert a yielding pressure upon a tire casing mounted upon the core.

8. A vulcanizing unit comprising means for supporting a tire in a substantially upright position, means for injecting steam into the space within said tire at a high part thereof, means for applying a fluid pressure to the outer surface of said tire and means for removing water of condensation from the lowermost part thereof.

9. A vulcanizing unit comprising means for supporting a tire in a non-horizontal position, means for injecting steam into the space within said tire at a high part thereof, means for removing water of condensation from the lowermost part thereof and means for applying a fluid pressure to the outer surface of said tire.

10. A vulcanizing unit, comprising means for supporting a tire in a non-horizontal position, means for injecting steam into the space within said tire at a high part thereof, but without exerting its pressure against the tire, means for removing water of condensation from the lowermost part thereof and means for exerting the pressure of a fluid to the outer surface of said tire.

11. A vulcanizing unit comprising a chambered core for supporting a tire, means for injecting steam into the core to heat the tire from the inside, means to chill the tire on the outside, and means to remove the water of condensation and steam from the core to maintain the circulation of heating fluid.

12. A vulcanizing unit comprising means to apply heat to the inner surface of a tire, and means to subject the outer surface of said tire to the cooling and pressure effect of a fluid while the inner surface of the tire is being heated.

13. A vulcanizing unit comprising means to apply heat without pressure to the inner surface of a tire and means to apply a cooling fluid to the tread portion of the tire while the inner surface of the tire is being heated.

14. A vulcanizing unit comprising means to apply heat without pressure to the inner surface of a tire and means to apply a cooling fluid under yielding pressure to the tread portion of the tire while the inner surface of the tire is being heated.

THOMAS MIDGLEY.